United States Patent Office 3,637,674
Patented Jan. 25, 1972

3,637,674
EPOXIDES OF ESTERS OF 2,4,6,10-TETRAENOIC ACIDS
Vaclav Jarolim, Karel Hejno, Karel Slama, and Frantisek Sorm, Prague, Czechoslovakia, assignors to Ceskoslovenska Akademie Ved, Prague, Czechoslovakia
No Drawing. Filed Oct. 8, 1969, Ser. No. 864,912
Claims priority, application Czechoslovakia,
Oct. 20, 1968, 7,127/68
Int. Cl. C07d 1/22
U.S. Cl. 260—240 R                  6 Claims

ABSTRACT OF THE DISCLOSURE

Methods employing and compositions comprising novel epoxides of esters of 2,4,6-10-tetraenoic acids for the control of insects.

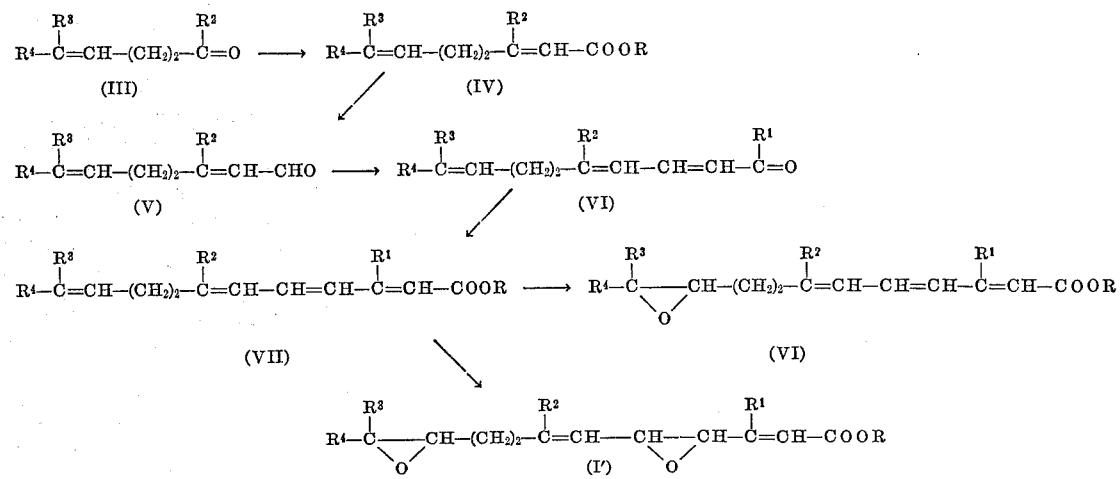

This invention relates to methods and compositions for the control of insects. More particularly, the present invention relates to methods and compositions for the control of insects and to novel 10,11-epoxides and 4,5,10,11-bisepoxides of esters of 3,7,11-trialkyl-2,4,6,10-tetraenoic acids.

A number of substances are known which have juvenile hormone activity demonstrated by stimulation of larval development, inhibition of metamorphosis and stimulation of ovarian growth in adult females. Farnesol, methyl 10,11-epoxyfarnesoate, esters of dihydrochlorofarnesoic acid, juvabione, dehydrojuvabione and derivatives of p-(1,5-dimethylhexyl)benzoic acid may be given as examples.

Compounds, the preparation and application of which are described herein, have a high specific activity for some insects which are considerably resistant to known juvenile hormone active substances. The compounds of the present invention act selectively on certain harmful insects and, moreover, exhibit high sterilizing properties.

The compounds of the present invention are represented by Formulas I and I′

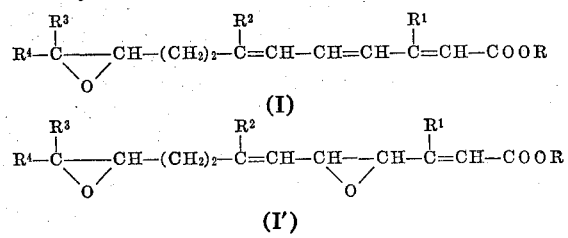

wherein R is lower alkyl, cycloalkyl or aralkyl and each of $R^1$, $R^2$, $R^3$ and $R^4$ is lower alkyl.

The term "lower alkyl," as used herein, refers to a straight or branched chain saturated aliphatic hydrocarbon group having a chain length of one to six carbon atoms, such as methyl, ethyl, propyl, i-propyl, t-butyl, pentyl and hexyl. The term "cycloalkyl," as used herein, refers to a cycloalkyl group having four to eight carbon atoms, such as cyclobutyl, cyclopentyl and cyclohexyl. The term "aralkyl," as used herein, refers to an aralkyl group having seven to twelve carbon atoms, such as benzyl, phenylethyl and napthylmethyl.

The epoxides of Formulas I and I′ are prepared according to the following procedures wherein R, $R^1$, $R^2$, $R^3$ and $R^4$ have the same meaning as given above.

In the practice of the above procedure, a ketone of Formula III is reacted with a dialkyl carbalkoxymethylphosphonate, such as dialkyl carbomethoxymethylphosphonate, in the presence of base, such as an alkali metal hydride or alkoxide, to yield the ester (IV). The ester of Formula IV is reduced as with lithium aluminum hydride, or the like, to the corresponding alcohol which is oxidized using manganese dioxide, Jones reagent, chromium trioxide, or the like, to yield the aldehyde (V). The aldehyde of Formula V is reacted with a ketone of the formula $CH_3$—CO—$R^1$ in the presence of base, such as sodium hydroxide in an organic solvent (Aldol), to yield the tri-unsaturated ketone (VI). The ketone of Formula VI is converted into the esters (VII) by treatment with a compound of Formula II or II′.

$(C_6H_5)_3P=CH-COOR$     (II)

$(RO)_2-\overset{O}{\underset{\|}{P}}-CH_2-COOR$     (II′)

The reaction of the ketone (VI) with a compound of Formula II is conducted in an organic solvent inert to the reaction, such as benzene, toluene, and the like, and preferably under an insert gas, such as nitrogen or argon. The reaction is preferably conducted at above room temperature to reflux and catalyzed using an acid, such as benzoic acid.

Conversion of the ketone (VI) to the ester (VII) using the phosphonate (II′) is carried out in an organic solvent inert to the reaction, such as dimethylformamide, dimethylsulfoxide, dioxane, diglyme, dimethyl Cellosolve and N-methylpyrrolidone in the presence of base, such as an alkali metal hydride or alkali metal alkoxide. The reaction is preferably conducted under an inert atmosphere.

An ester of Formula VII upon treatment with an ethereal solution of perphthalic acid affords the monoexpoxide I and by using a two-fold amount of perphthalic acid the bisepoxide I' is obtained.

Each of the epoxides I and I' is useful for the control of insects as an isomeric mixture or as individual isomers. In the case of individual isomers, the configuration at C–2,3 is preferably trans. The isomers can be separated by adsorption chromatography, gas chromatography or fractional distillation under dimnished pressure.

In accordance with the present invention, there is provided a method for the control of insects which comprises contacting the insects with a compound selected from those of Formula I or I' above or a mixture thereof in an amount effective to inhibit the metamorphosis of said insects. To aid in achieving a uniform distribution or application, it is advantageous to employ a composition comprising an inert carrier and, as the essential active ingredient, a compound of Formula I or I'. One method for the control of insects in accordance with the present invention is to apply the composition comprising an inert carrier and a compound of Formula I or I' to the locus of insect infestation, such as to the plant life on which the insects live. These compositions can be either solid or liquid. Solid compositions for treating insects can be prepared by incorporating the active compound with an inert carrier, such as finely divided talc, silica, pyrophyllite or clay or granular inert carriers, such as the vermiculites. Liquid compositions can be prepared by mixing the active compound with inert carriers, such as acetone, xylene, peanut oil, cottonseed oil, sesame oil and other vegetable oils and mineral oils conventionally employed as carriers in insecticidal formulations for application by spraying. Emulsions containing the active ingredient can also be used. Other ingredients can be present in the compositions of the present invention to aid in the effective application of the active ingredient, such as wetting agents, dispersing agents, insect attractants, and the like. The concentration of active ingredient of a compound of Formula I or I' in the composition can vary greatly and will depend on a variety of factors, such as the specific insect involved, degree of insect infestation, locus of insect infestation, environmental and weather conditions and type of application device used. Generally, the composition will contain less than 95% by weight of the active ingredient and more frequently less than 10% by weight. The compounds of Formulas I and I' are useful insect control agents by virtue of their ability to inhibit the metamorphosis of the insect. The expression "to inhibit the metamorphosis of said insect," as used herein, and in the appended claims, is used to describe the direct insecticidal effect of the compounds of Formulas I and I' as well as the indirect insecticidal effect of said compounds. In some cases, the compounds have a direct insecticidal effect in that the insect dies upon contact with a compound of Formula I or I', particularly when the compound is applied at the egg stage and larvae stage of the insect's life. In other cases, the compounds of the present invention have an indirect insecticidal effect in that upon contact with a compound of Formula I or I' during the egg stage, larvae stage or pupa stage, the insect is unable to pass from one metamorphic stage to the next in a normal manner and eventually dies without reproducing.

The following examples are presented to illustrate the present invention.

EXAMPLE 1

To 11.2 g. of diethyl carbomethoxymethylphosphonate in 100 ml. of diglyme is added 2.4 g. of sodium hydride. The mixture is stirred until the evolution of gas ceases and 6.5 g. of 7-methylnon-6-en-3-one is slowly added with stirring, maintaining a temperature below 30° C. The mixture is stirred for about one hour at room temperature and then diluted with water and extracted with ether. The ether extracts are washed well with water, dried over sodium sulfate and evaporated to remove solvent to yield methyl 3-ethyl-7-methylnona-2,6-dienoate.

By using 6-methylhept-5-en-2-one and 6-methyloct-5-en-2-one in the above procedure in place of 7-methylnon-6-en-3-one, there is obtained methyl 3,7-dimethylocta-2,6-dienoate and methyl 3,7-dimethylnona-2,6-dienoate, respectively.

EXAMPLE 2

One gram of methyl 3-ethyl-7-methylnona-2,6-dienoate in 30 ml. of anhydrous ether is added slowly to a stirred suspension of one g. of lithium aluminum hydride in 30 ml. of anhydrous ether at 0° C. under nitrogen. The mixture is stirred for about eight hours and then treated with acetic acid and filtered. The filter is washed with ether and the washings and filtrate combined, separated and the ether phase dried over sodium sulfate. The ether phase is evaporated to yield 3-ethyl-7-methylnona-2,6-dien-1-ol.

Similarly, each of methyl 3,7-dimethylocta-2,6-dienoate and methyl 3,7-dimethylnona-2,6-dienoate is reduced to 3,7-dimethylocta-2,6-dien-1-ol and 3,7-dimethylnona-2,6-dien-1-ol, respectively.

EXAMPLE 3

A mixture of 5.6 g. of 3-ethyl-7-methylnona-2,6-dien-1-ol, 200 ml. of petroleum ether (B.P. 40–50° C.) and 50 g. of manganese dioxide is stirred for about 24 hours (progress of reaction is followed by thin layer chromatography). The mixture is filtered and the filter washed with petroleum ether. Combined filtrate and washings is washed with water, dried over magnesium sulfate and evaporated to yield 3-ethyl-7-methylnona-2,6-dien-1-al.

3,7-dimethylocta-2,6-dien-1-al and 3,7-dimethylnona-2,6-dien-1-al are similarly prepared from the corresponding C–1 alcohol.

EXAMPLE 4

A mixture of 2.3 g. of 3-ethyl-7-methylnona-2,6-dien-1-al, 2 g. of acetone, 40 ml. of water, 70 ml. of ethanol and 0.3 g. of sodium hydroxide is stirred efficiently for 24 hours. Then 2 g. of acetone is added and stirring continued overnight. The mixture is diluted with water, shaken with ether (3× 50 ml.), separated and extracts combined. The combined extracts are washed well with water, dried and evaporated to yield 6-ethyl-10-methyldodeca-3,5,9-trien-2-one which can be purified by distillation or gas-liquid chromatography.

By using methyl ethyl ketone in place of acetone in the foregoing procedure, there is obtained 7-ethyl-11-methyltrideca-4,6,10-trien-3-one.

By using each of 3,7-dimethylocta-2,6-dien-1-al and 3,7 - dimethylnona - 2,6-dien-1-al in place of 3-ethyl-7-methylnona-2,6-dien-1-al in the above procedure, there is obtained 6,10 - dimethylundeca-3,5,9-trien-2-one (pseudoionone) and 6,10-dimethyldodeca-3,5,9-trien-2-one.

EXAMPLE 5

A mixture of 11.2 g. of diethyl carbomethoxymethylphosphonate in 100 ml. of diglyme is treated with 2.4 g. of sodium hydride. This mixture is stirred until the evolution of gas ceases and 7.5 g. of 6-ethyl-10-methyldodeca-3,5,9-trien-2-one is then added slowly with stirring while maintaining a temperature below 30° C. The mixture is stirred for about 30 minutes and then diluted with water and extracted with ether. The ether extracts are combined, washed well with water, dried over sodium sulfate and evaporated to yield methyl 3,11-dimethyl-7-ethyltrideca-2,4,6,10-tetraenoate which is purified by chromatography.

By use of the procedure of this example, there is prepared methyl 3,7,11 - trimethyldodeca-2,4,6,10-tetraenoate and methyl 3,7,11 - trimethyltrideca-2,4,6,10-tetraenoate from 6,10 - dimethylundeca-3,5,9-trien-2-one and 6,10-dimethyldodeca-3,5,9-trien-2-one.

The ethyl esters, e.g. ethyl 3,11-dimethyl-7-ethyltrideca-2,4,6,10-tetraenoate, are prepared by using diethyl carbethoxymethylphosphonate in place of diethyl carbomethoxymethylphosphonate in the foregoing procedure.

EXAMPLE 6

Preparation of methyl 3,7,11-trimethyl-2,4,6,10-dodecatetraenoate: A mixture of methoxycarbonylmethylenetriphenylphosphorane (10 g.), pseudoionone (8 g.), benzoic acid (0.5 g.) and absolute benzene (30 ml.) is gently refluxed under nitrogen for 18 hours. A further amount of the phosphorane (0.25 g.) is added and the heating is continued for additional 18 hours. The solvent is removed by distillation and the viscous residue is extracted with four 20-ml. portions of petroleum ether. The extracts are combined, washed with 3% aqueous sulfuric acid, aqueous sodium hydrogen carbonate and water till neutral, dried and evaporated. The residue is subjected to a fractional distillation under diminished pressure. The desired methyl 3,7,11-trimethyl-2,4,6,10-dodecatetraenoate shows the B.P. 120–125° C./0.01 mm. Hg. For $C_{16}H_{24}O_2$ (248.4) calculated: 77.37% C, 9.74% H. Found: 77.40% C, 9.69% H. As shown by infrared spectra, the product contains a double bond in conjugation to the carboxylic group. The gas chromatography affords four maxima. When subjected to the thin-layer chromatography on silica gel, the product shows two spots.

EXAMPLE 7

Preparation of ethyl 3,7,11-trimethyl-2,4,6,10-dodecatetraenoate: The procedure is analogous to Example 6 except for the use of ethoxycarbonylmethylenetriphenylphosphorane instead of the methyl analogue. The resulting ethyl ester shows the B.P. 130–135° C./0.01 mm. Hg. For $C_{17}H_{26}O_2$ (262.4) calculated: 77.81% C, 9.99% H. Found: 77.51% C, 9.95% H.

EXAMPLE 8

Preparation of benzyl 3,7,11-trimethyl-2,4,6,10-dodecatetraenoate: A mixture of methyl 3,7,11-trimethyl-2,4,6,10-dodecatetraenoate (2.5 g.), benzyl alcohol (2.2 g.), aluminum ethoxide (0.1 g.) and p-phenylenediamine (0.2 g.) is heated to 120° C. under nitrogen for 10 hours. The methanol liberated by the reaction is removed by distillation. The residual reaction mixture is diluted with ether, the ethereal layer separated, washed with 3% aqueous sulfuric acid and water till neutral and evaporated. The residue is distilled under diminished pressure. Yield, 2 g. of benzyl 3,7,11 - trimethyl - 2,4,6,10-dodecatetraenoate, B.P. 180° C. at 0.01 mm. Hg. For $C_{22}H_{28}O_2$ (324.4) calculated: 81.26% C, 8.70% H. Found: 81.00% C, 8.50% H.

EXAMPLE 9

By using cyclopentanol in place of benzyl alcohol in the procedure of Example 8, there is obtained cyclopentyl 3,7,11-trimethyldodeca-2,4,6,10-tetraenoate.

EXAMPLE 10

Separation of geometrical isomers of 3,7,11-trimethyl-2,4,6,10-dodecatetraenoic acid methyl ester: The separation is performed by preparative gas chromatography at 190° C. with the use of a 75 cm. column equipped with a hot wire analyzer unit and packed with silanized Chromosorbe containing 5% Apiezone L. The adsorption chromatography was performed on a 150-fold amount of silica gel previously deactivated by the addition of 12% of water and with the use of petroleum ether containing 5% of diethyl ether as the eluant.

EXAMPLE 11

Preparation of methyl 3,7,11-trimethyl-2,4,6,10-dodecatetraenoate 10,11-monoepoxide: An ethereal solution (5 ml.) of methyl 3,7,11-trimethyl-2,4,6-10-dodecatetraenoate (650 mg.) is treated with an ethereal solution of perphthalic acid (475 mg.), the resulting mixture is allowed to stand at 0° C. for 3 days, and filtered to remove phthalic acid. The filtrate is washed with an aqueous solution of sodium hydrogen carbonate and water, dried, and evaporated. The residue is distilled to afford an almost quantitative yield of the 10,11-monoepoxide, B.P. 130° C./0.01 mm. Hg.

EXAMPLE 12

Preparation of methyl 3,7,11-trimethyl-2,4,6,10-dodecatetraenoate 4,5;10,11-diepoxide: The preparation is performed in analogy to Example 11 except for the use of a twofold amount of perphthalic acid. The B.P. of the 4,5; 10,11-diepoxide is 150° C./0.01 mm. Hg.

Both the monoepoxide of Example 11 and the diepoxide of Example 12 are characterised by elemental analysis (content of one or two epoxidic oxygen atoms) and infrared spectra (absorption bands due to the presence of a carboxylic function in conjugation with a double bond).

EXAMPLE 13

The procedure of Example 11 is repeated using each of ethyl 3,7,11 - trimethyldodeca - 2,4,6,10-tetraenoate, ethyl 3,11 - dimethyl - 7 - ethyltrideca-2,4,6,10-tetraenoate and ethyl 3,7,11-trimethyltrideca-2,4,6,10-tetraenoate as the starting material to yield ethyl 10,11-oxido-3,7,11-trimethyldodeca-2,4,6-trienoate, ethyl 10,11-oxido-3,11-dimethyl-7-ethyltrideca-2,4,6-trienoate and ethyl 10,11-oxido-3,7,11-trimethyltrideca-2,4,6-trienoate.

EXAMPLE 14

The procedure of Example 12 is repeated using as the starting material each of ethyl 3,7,11-trimethyldodeca-2,4,6,10-tetraenoate, ethyl 3,11-dimethyl-7-ethyltrideca-2,4,6,10-tetraenoate, and ethyl 3,7,11-trimethyltrideca-2,4,6,10-tetraenoate to yield ethyl 4,5;10,11-bisoxido-3,7, 11-trimethyldodeca-2,6-dienoate, ethyl 4,5;10,11-bisoxido-3,11-dimethyl-7-ethyltrideca-2,6-dienoate and ethyl 4,5; 10,11-bisoxido-3,7,11-trimethyl-trideca-2,6-dienoate.

Testing of the juvenile hormone activity

Two types of tests were used to determine the juvenile hormone activity of esters according to the present invention.

(a) In the topical assay, test substances were applied to abdominal tergites of freshly moulted larvae of the last instar of Hemiptera as acetone solutions of 1 μl. drops per specimen (the acetone solutions were diluted 1:10, 1:100, 1:1000, etc.).

(b) In the injection assay, test substances were injected in 1 μl. olive oil into the body cavity in dilutions analogous to those in the topical assay. The injection assay was used in combination with the topical assay, especially with freshly moulted pupae of Coleoptera and Lipidoptera.

The juvenile hormone activity was evaluated from the degree of the morphological inhibition of metamorphosis. With larvae of Exopterygote insect, the application of esters according to the present invention results in formation of giant larvae or the so-called half-larval half-imaginal adultoids. In the case of Endopterygote insect pupae, intermediary forms between pupa and imago or monstrous secondary pupae result.

The juvenile hormone activity of esters according to the present invention is shown in the following table and is expressed in units indicating the amount of the substance in micrograms per specimen which caused formation of half-larval adultoids (with Hemiptera) or half-pupal adultoids (with beetles and butterflies). The range of the juvenile hormone activity varies by one order of magnitude with Hemiptera and by two to three orders of magnitude with beetles. Thus, e.g. when the activity unit is 0.05 μg. per specimen, the substance will show first signs of activity when applied at approximately 0.01 μg. per specimen, and maximum activity when more than 0.1 μg. per specimen is applied.

| Insect | First sign of activity | Activity unit | Compound |
|---|---|---|---|
| *Pyrrhorcoris opterus* (topical) | 0.8 | 3 | A |
|  | 0.8 | 3 | B |
|  | 1 | 5 | C |
|  | 0.3 | 0.8 | D |
| *Dysdercus intermedius* (topical) | 0.5 | 1 | A |
|  | ---- | ---- | B |
|  | 0.1 | 0.7 | C |
|  | 0.1 | 0.7 | D |
| *Graphasoma italicum* (topical) | 0.3 | 0.8 | A |
|  | 0.5 | 1 | B |
|  | 0.5 | 1 | C |
|  | 1 | 5 | D |
| *Tenebrio molitor* (topical) | 1,000 | 1,000 | A |
|  | ---- | ---- | B |
|  | 1 | 100 | C |
|  | ---- | ---- | D |
| *Tenebrio molitor* (injection) | 1 | 10 | A |
|  | 1 | 100 | B |
|  | 1 | 100 | C |
|  | 10 | 1,000 | D |

In the above table, compound A is methyl 3,7,11-trimethyldodeca-2,4,6,10-tetraenoate; compound B is ethyl 3,7,11-trimethyldodeca-2,4,6,10-tetraenoate; compound C is methyl 10,11 - oxido - 3,7,11-trimethyldodeca-2,4,6-trienoate and compound D is methyl 4,5;10,11-bisoxido-3,7,11-trimethyldodeca-2,6-dienoate.

As may be seen from the above table, the novel epoxy derivatives according to the present invention exhibit a specific activity on three Hemiptera species, namely, *Pyrrhocoris apterus*, *Dysdercus intermedius*, and *Graphosoma italicum*, and a very low activity on the beetles Tenebrio. The activity of about 1 microgram on *Graphosoma italicum* is of special interest since this insect is very resistant towards juvenile hormones which may be active on other Hemiptera species. Concerning the grain pests, the activity unit of novel epoxy derivatives on *Eurygaster-intergriceps* and *Aelia acuminata* is below 10 micrograms. The novel epoxy derivatives show juvenile hormone activity also on Gryllus (resistant towards other juvenile hormone-like substances) and a lower activity on migratory locus (Schistocerca).

What is claimed is:
1. A compound selected from those having the formula I or I':

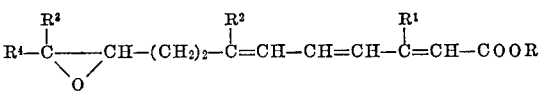

(I)

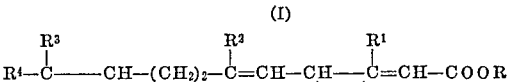

(I')

wherein, R is lower alkyl, cycloalkyl or aralkyl and each of $R^1$, $R^2$, $R^3$ and $R^4$ is lower alkyl.

2. A compound according to claim 1 wherein each of $R^1$, $R^2$, $R^3$ and $R^4$ is methyl or ethyl.

3. A compound according to claim 1 wherein each of $R^1$ and $R^4$ is methyl and each of $R^2$ and $R^3$ is methyl or ethyl.

4. A compound according to claim 3 wherein R is lower alkyl.

5. A compound according to claim 3 wherein R is methyl or ethyl.

6. A compound according to claim 3 wherein R is benzyl.

References Cited
UNITED STATES PATENTS 3,453,362   7/1969   Cruickshank _____ 260—348 A
3,513,176   5/1970   Andrews et al. _____ 260—348 A NORMA S. MILESTONE, Primary Examiner U.S. Cl. X.R.

260—240 H, 348 A, 410, 410.9 R; 424—278